United States Patent
Gruhlke

(10) Patent No.: US 7,889,171 B2
(45) Date of Patent: Feb. 15, 2011

(54) CHIRPED GRATING FINGER NAVIGATION

(75) Inventor: Russell W. Gruhlke, Fort Collins, CO (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1311 days.

(21) Appl. No.: 11/242,558

(22) Filed: Oct. 3, 2005

(65) Prior Publication Data

US 2007/0077900 A1 Apr. 5, 2007

(51) Int. Cl.
*G09G 5/00* (2006.01)
*G09G 5/08* (2006.01)

(52) U.S. Cl. ...................... 345/156; 345/166

(58) Field of Classification Search ......... 345/156–184; 463/37; 356/24, 305, 328–330, 334
See application file for complete search history.

(56) References Cited

U.S. PATENT DOCUMENTS

| | | | |
|---|---|---|---|
| 6,424,407 B1* | 7/2002 | Kinrot et al. | ............... 356/28 |
| 6,707,027 B2* | 3/2004 | Liess et al. | ............... 250/221 |
| 7,116,427 B2* | 10/2006 | Baney et al. | ............... 356/498 |

* cited by examiner

*Primary Examiner*—Jimmy H Nguyen

(57) ABSTRACT

One embodiment of the invention is a user input system for a hand held computing device that comprises a movable piece with a reflective side, an optical cavity adjacent to said movable piece, a light emitting source positioned within the cavity such that emitted light is incident on to the reflective side of the movable piece, and a sensor positioned within the cavity to receive light reflected from the reflective side.

20 Claims, 5 Drawing Sheets

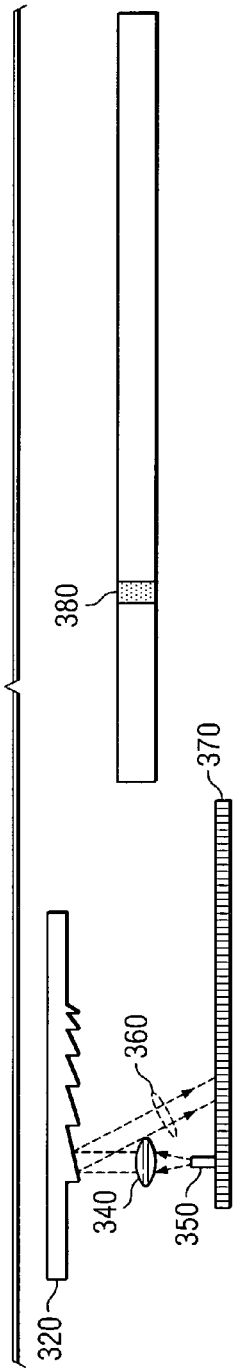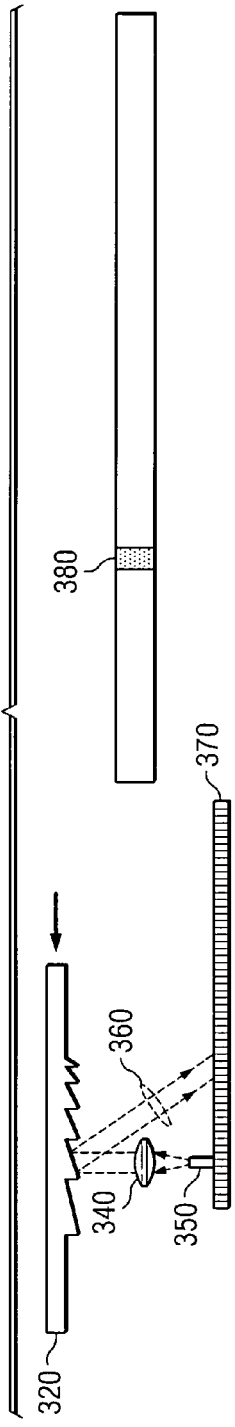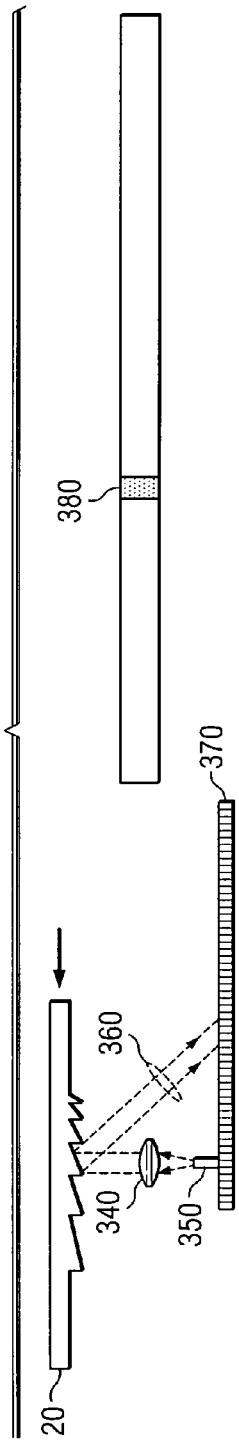

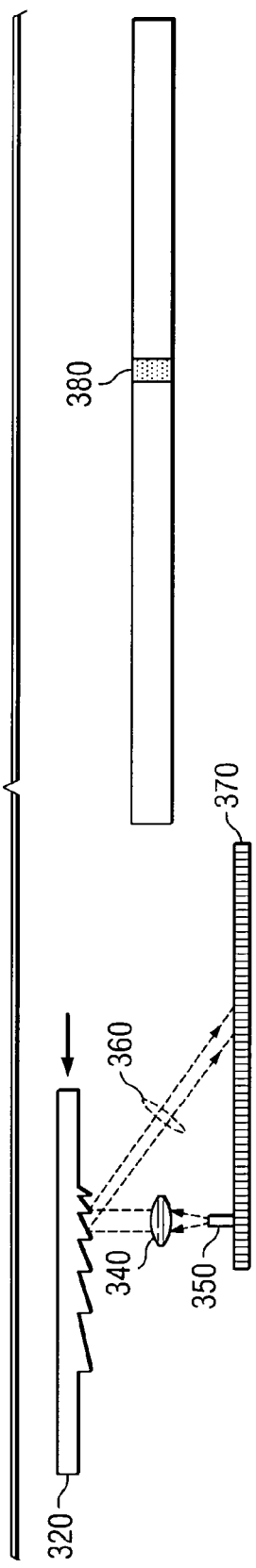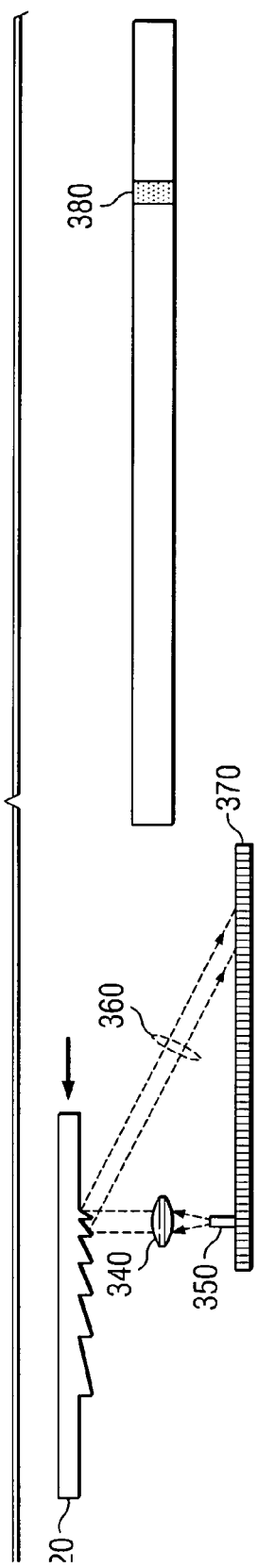

CHIRPED GRATING FINGER NAVIGATION

BACKGROUND OF THE INVENTION

Hand held computing devices, such as mobile phones, currently support file sharing, emailing, instant messaging, picture taking and many other functions, and while the displays on these devices have evolved into sophisticated graphical displays, the menu navigation input devices have not.

Currently, mobile phones use a rocker arm switch as a navigation input. The user may move the switch in one of four positions, e.g. up, down, left, and right, to traverse the device's numerous menus and select from the many functions available. Other rocker arms have two positions, e.g. left and right. As the functionality available on mobile phones and other hand-held devices rapidly approaches that of personal computers, this restricted movement is less than optimal.

Users may desire the unrestricted movement that is similar to what is available on personal computers through the use of a mouse, a joystick, touch screen and/or a trackball. However, the amount of space required. However, the amount of space required for these input devices is too large to be used on mobile phones and other hand held devices. If these devices were to be made small enough to fit on the mobile phone or other hand held device, then the human finger is too large to interact with the input device.

BRIEF SUMMARY OF THE INVENTION

The present invention is directed to a system and method which provides a user interface to a hand held computing device, such as mobile phone. One embodiment of the invention comprises a moveable piece with an optical cavity and optics positioned underneath it. The moveable piece is positioned and sized so that it can be moved using a finger or any other object of similar size and proportion. Inside the cavity, light is directed toward the reflective underside of the moveable piece and is reflected onto the sensor. The sensor then measures the position of the light that is reflected upon it which is translated into position information relative to the moveable piece. That position information is used to determine the motion of the finger which can be used to drive a cursor on the screen of the device.

The invention allows continuous movement of the cursor around the screen in any direction as opposed to the current up/down, left/right, rocker switch. If the sensor's pixels were infinitesimally small, an infinite number of positions and motions could be sensed by the system. While this is not the case, the pixels are small enough for a user to continuously drive a cursor in any direction.

BRIEF DESCRIPTION OF THE DRAWINGS

For a more complete understanding of the present invention, reference is now made to the following descriptions taken in conjunction with the accompanying drawing, in which:

FIGS. 3A-3E depict examples of light moving along the sensor as the moveable piece is moved for one embodiment of the invention;

DETAILED DESCRIPTION OF THE INVENTION

Figure 1:
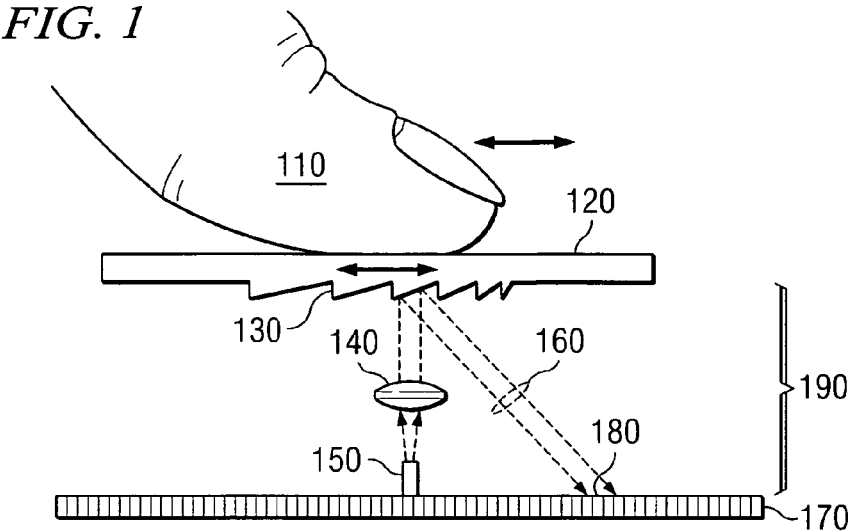
FIG. 1 depicts a horizontal cutaway view of one embodiment of the invention.

FIG. 1 depicts an example of one embodiment of the invention. The figure shows the user's finger 110 engaging the moveable piece (hereinafter "cover slip") 120 in a horizontal (left or right) direction. On the underside of the cover slip 120 is a chirped grating 130 represented by a saw tooth structure of varying periodicity, and beneath the cover slip 120 is the optical cavity 190. For eye safety purposes, the grating 130 should reflect most or all light and no light escapes from the optical cavity 190 in this embodiment. The grating may be metalized to improve reflectivity.

Inside the optical cavity 190 is a collimating lens 140 and a light source 150. In this embodiment, a Vertical Cavity Surface Emitting Laser (VCSEL) is used as the light source 150; however, the invention is not limited to only this source. Other types of lasers or light sources may be used, for example a light emitting diode (LED), but the invention is not limited to these types of sources. Underneath the VCSEL 150, this embodiment includes a pixilated linear sensor 170 that receives the light that is emitted by the source and reflected by the grating. One embodiment may have a cavity that is approximately 10 millimeters in length, with the distance from the cover slip 120 to the light source 150 is less than approximately 2 millimeters.

This embodiment measures movement in one dimension. The VCSEL 150 directs light through a collimating lens 140 and to be incident upon the chirped grating 130 on the underside of the slip cover 120. As shown in the figure, the light 160 is diffractively reflected back onto the sensor 170. Because the chirped grating 130 is of varying periodicity, light coming from the stationary source (VCSEL) 150 will diffractively reflect to a different location or "spot" 180 on the sensor for each different position of the slip cover 120 as it is moved in the dimension shown on the figure (left and right as shown). This means the position of the cover slip 120 and accordingly, the finger 110, is directly correlated to the position of the spot 180 on the sensor 170 and thus, the position of the finger 110 can be tracked. The sensor is connected to a processor or other electronic component and receives a signal from the sensor. The processor uses the signal as user input for the hand held computing device. For example, movement of slip cover may be used to navigate a display screen similar to a mouse, joystick, or trackball.

FIGS. 3A-3E illustrates this concept as it shows five different snapshots of the embodiment described in FIG. 1. At the cover slip's 320 initial position, FIG. 3A, the light 360 strikes the grating where its periodicity is 10 microns (for example) and it is reflected at a very small angle which puts a spot 380 close to the source 350 on the far left side of the sensor 370. As the cover slip 320 is moved to the left, as shown in FIGS. 3B-3E, the periodicity of the grating above the light source gradually changes from 10 microns down to 1 micron. Accordingly, as the cover slip 320 is moved to the left, the reflection angle increases and the reflected light 360 puts a spot 380 on the sensor 370 that is farther away from the source 350. Because the spot 380 moves from the left to the right as the cover slip 320 is moved from the right to the left, there is a constant correlation between the position of the cover slip 320 and the spot 380 on the sensor 370. The position of the light on the sensor can be used by the device to determine a location of the cover slip, and accordingly the finger or other object that is moving the cover slip.

Figure 2A:
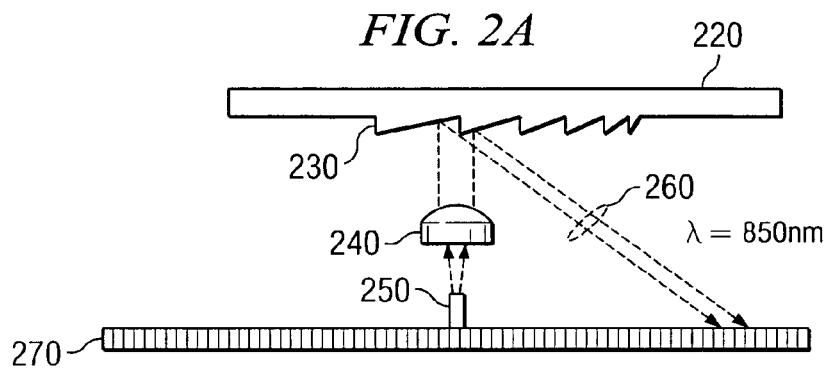
FIG. 2 depicts front and side view of an arrangement of one embodiment of the invention.
Figure 2B:
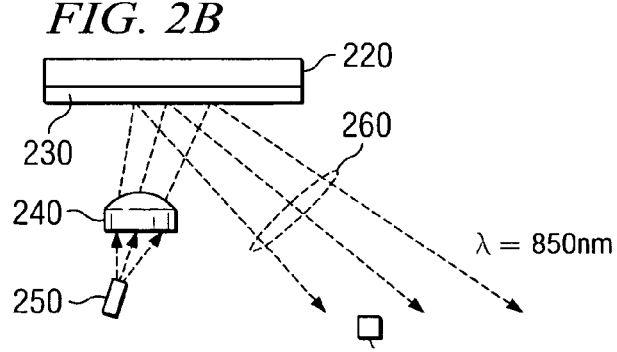

FIG. 2A depicts a side view of an exemplary design of one embodiment, while FIG. 2B depicts a side view that is orthogonal to the view of FIG. 2A of same embodiment. FIG. 2A depicts the sensor 270 at the bottom with the light source 250 positioned slightly above it. The light exits the source 250 and enters a cylindrical collimating lens 240. The cylindrical beam collimates on only one axis as depicted by the flat beam of reflected light 260. One axis is acceptable for this embodiment, because the position is measured in only one dimension.

After exiting the collimating lens 240 the beam strikes the reflective grating 230 and diffractively reflects back towards the sensor 270. The beam strikes the sensor 270 some distance from the source 250.

The side view shown FIG. 2B is of the of the same embodiment. This view is useful to illustrate how the beam 260 is collimated in only one dimension and how the source 250 is positioned in a manner such that light is emitted at an angle. This helps direct the reflected light away from the source 250 and lens 240 combination so that it does not reflect back onto itself creating a "dead" zone.

The light sources used in the various embodiments depicted herein may have a wavelength of 850 nanometers, which is a typical VCSEL emission wavelength. However, other wavelengths may be used.

Figure 4:
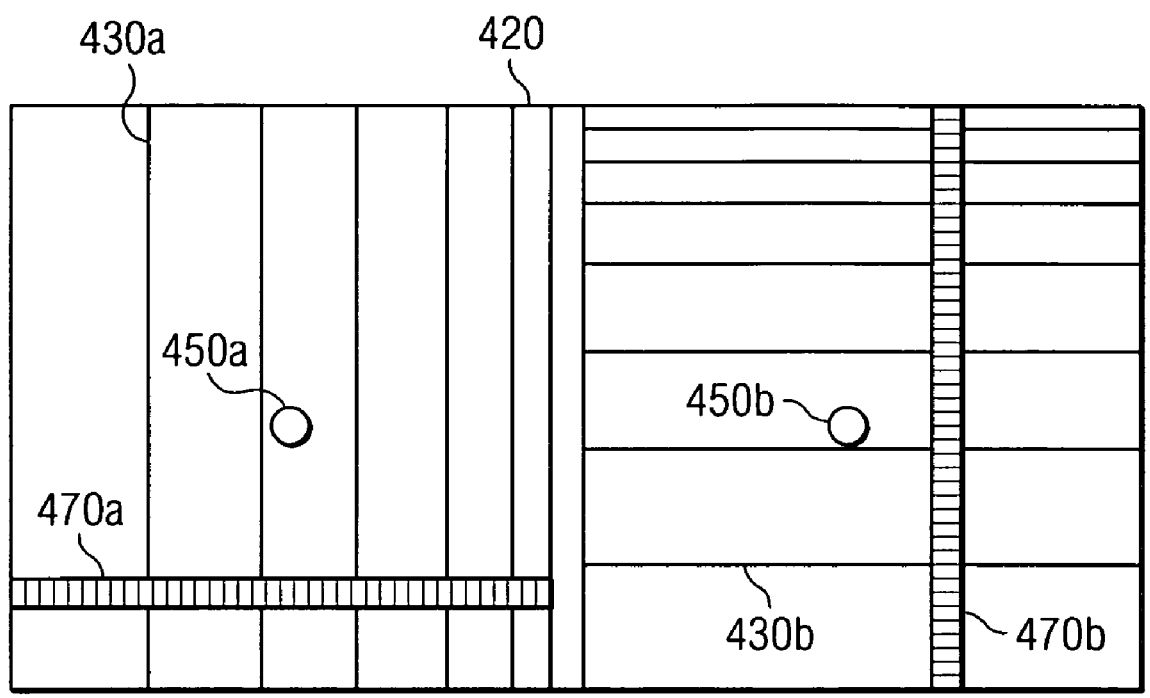
FIG. 4 depicts a top down view of another embodiment of the invention that tracks movement in two dimensions using two light emitters and two sensors.

FIG. 4 depicts an embodiment that measures motion in two dimensions using two light sources 450a, 450b and two sensors 470a, 470b. It is a top down view looking down through the cover slip 420, which is shown as transparent to illustrate the details of the embodiment. This embodiment uses two separate optical systems, e.g. one to measure X motion and one to measure Y motion. The embodiment is essentially two iterations of the embodiment shown in FIG. 1, with one iteration rotated 90 degrees from the other.

As shown in FIG. 4, there are two separate gratings 430a, 430b, located underneath a single cover slip 420 with the left portion of the figure measuring X motion and the right portion of the figure measuring Y motion. The light from the first source 450a strikes the grating 430a and reflects onto the linear sensor 470a which is positioned parallel to the dimension being measured and perpendicular to the grating lines 430a of varying periodicity. As the cover clip 420 moves to the left or right, the light strikes the grating 430a at a point of unique periodicity relative to other positions in that dimension and as a result, it is reflected onto a different position on the sensor. This enables position tracking and motion sensing for the X dimension.

The right side of FIG. 4 is the same as the left side, but rotated 90 degrees so that it measures position and motion in the Y dimension.

Figure 5A:
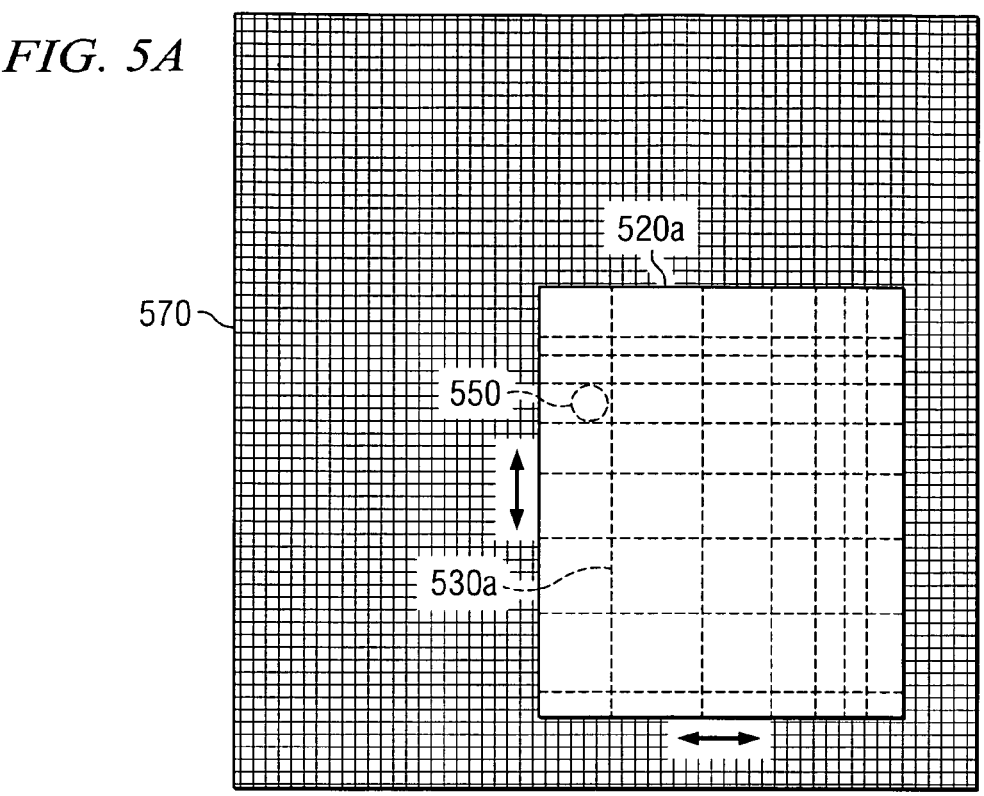
FIGS. 5A and 5B depict top down views of two embodiments of the invention that track movement in two dimensions using one light emitter and one sensor.
Figure 5B:
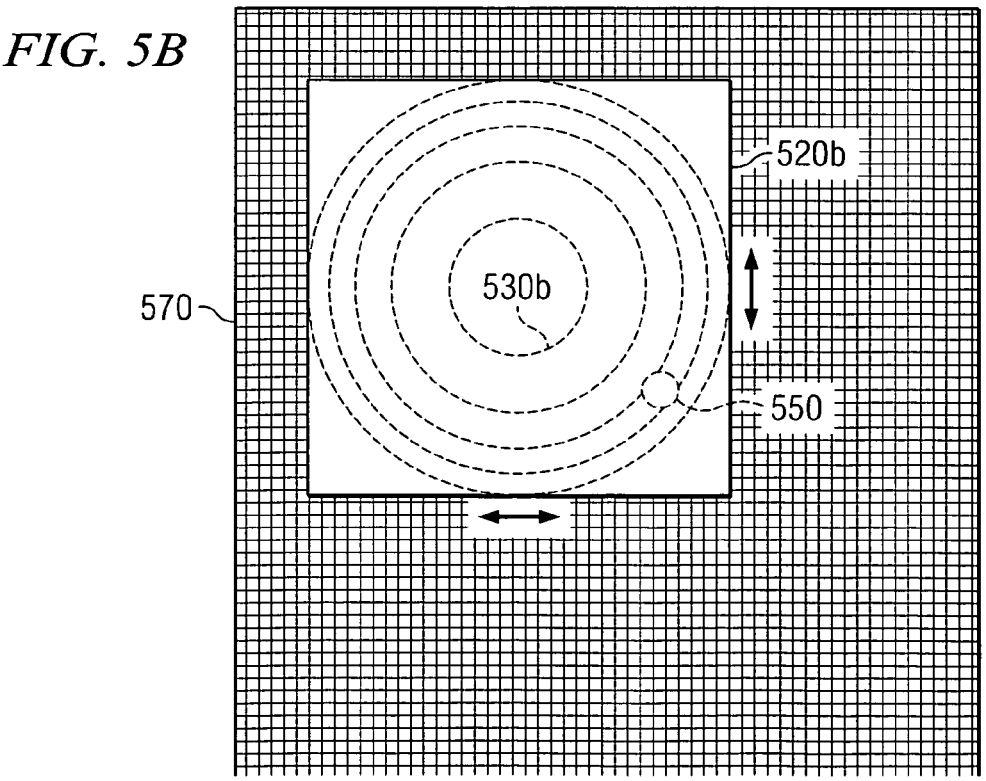

FIGS. 5A and 5B depict top down views of two embodiments that measure motion in two dimensions with the use of only one light source 550 and an area sensor 570. These embodiments will save the cost of a second laser, as well as a second sensor. As with FIG. 4, these are top down views of the embodiments with the cover slips 520a, 520b, seen as transparent in the figure to illustrate the details of the embodiments.

FIG. 5A depicts an embodiment using a chirped bi-grating 530a, on the underside of the cover slip 520a. This grating 530a has lines of varying periodicity in both the X and Y dimensions so that for each unique position of the cover slip 520a the light is diffractively reflected to a unique position onto the area sensor 570.

FIG. 5B depicts an embodiment using a kinoform grating 530b on the underside of the cover slip 520b. This shape will also make it so that for each unique position of the cover slip 520b the light is diffractively reflected to a unique position onto the area sensor 570.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A hand held computing device comprising:
   a cover slip with a reflective side;
   an optical cavity adjacent to said cover slip;
   a light emitting source positioned within the cavity such that emitted light is incident on to the reflective side of the cover slip; and
   a sensor positioned within the cavity to receive light reflected from the reflective side of the cover slip;
   wherein the cover slip is movable by a finger of a user of the hand held device relative to the sensor in at least one dimension; and
   wherein the sensor is positioned and the reflective side has ridges forming a grating with varying periodicity and arranged such that the reflected light is incident upon the sensor at a different location on the sensor for each unique position of the cover slip as the cover slip moves relative to the sensor in the at least one direction.

2. The device of claim 1, wherein the sensor is positioned and the reflective side has ridges arranged such that the reflected light is incident upon the sensor at no more than one location for each unique position of the cover slip as the cover slip moves relative to the sensor in the at least one dimension.

3. The device of claim 1, wherein the ridges form the shape of a chirped grating with varying periodicity.

4. The device of claim 1, wherein the cover slip is movable in two dimensions, and wherein the sensor is positioned and the reflective side has ridges arranged such that the light is incident upon the sensor at no more than one location for each unique position of the cover slip as the cover slip moves in the two dimensions.

5. The device of claim 4, wherein the ridges form the shape of a chirped bi-grating of varying periodicity.

6. The device of claim 4, wherein the ridges form the shape of a kinoform.

7. The device of claim 4, wherein the sensor is an area sensor.

8. The device of claim 1, wherein the cover slip is movable by the finger in two dimensions, wherein the reflective side has a first portion having ridges arranged in a first arrangement and a second portion with ridges arranged in a second arrangement, and the first arrangement is orthogonal to the second arrangement.

9. The device of claim 8, further comprising:
- another light emitting source positioned within the cavity such that emitted light is incident on to the reflective side of the cover slip; and
- another sensor positioned within the cavity to receive light reflected from the reflective side;
- wherein the sensor is positioned and the first portion of the reflective side has ridges arranged such that the light is incident upon the sensor at no more than one location for each unique position of the cover slip as the cover slip moves in the two dimensions; and
- wherein the another sensor is positioned and the second portion of the reflective side has ridges arranged such that the light is incident upon the another sensor at no more than one location for each unique position of the cover slip as the cover slip moves in the two dimensions.

10. The device of claim 1, further comprising:
- a collimating lens positioned between the light emitting source and the reflective side of said cover slip.

11. The device of claim 10, wherein the collimating lens comprises a cylindrical lens.

12. The device of claim 1, wherein the cover slip comprises metal.

13. The device of claim 1, wherein the light emitting source comprises a vertical cavity surface emitting laser.

14. The device of claim 1, wherein the sensor is a pixilated linear sensor.

15. The device of claim 1, wherein the hand held computing device comprises a processor that receives a signal from the sensor and uses the signal as user input for the hand held computing device.

16. The device of claim 1, wherein the hand held computer device is a cellular telephone.

17. A method of using a hand held computing device comprising:
- moving a movable piece with a reflective side to a desired location by a finger of a user, wherein the movable piece is moved relative to a sensor in at least one dimension and wherein the movable piece has ridges forming a grating with varying periodicity and arranged such that the reflected light is incident upon the sensor at a different location on the sensor for each unique position of the movable piece as the movable piece moves relative to the sensor in the at least one direction;
- impinging light onto the reflective side of the movable piece;
- detecting, via the sensor, light reflected from the reflective side of the movable piece;
- producing a signal based on the detected light; and
- processing the signal as user input for the hand held computing device.

18. The method of claim 17, wherein the moving comprises moving the movable piece in two dimensions, and the detecting comprises detecting reflected light to indicate a unique position of the movable piece as the movable piece moves in the two dimensions.

19. A hand held computing device comprising:
- means for interfacing with a finger of a user of the hand held computing device that comprises a reflective surface and is moveable by the finger of the user in at least one dimension;
- means for providing light to the reflective surface; and
- means for sensing light reflected from the reflective surface;
- wherein the means for interfacing with a user is movable by the finger of the user relative to the means for sensing in at least one dimension; and
- wherein the means for sensing is positioned and the reflective surface has ridges forming a grating with varying periodicity and arranged such that the reflected light is incident upon the means for sensing at a different location on the means for sensing for each unique position of the means for interfacing as the means for interfacing moves relative to the means for sensing in the at least one direction.

20. The device of claim 19, wherein the means for interfacing is movable in two dimensions, and the means for sensing is capable of detecting each unique position of the movable piece as the movable piece moves in the two dimensions based on the reflected light.

* * * * *